United States Patent [19]

Clunis

[11] 4,102,536
[45] Jul. 25, 1978

[54] PHONOGRAPH PICKUP DEVICE
[75] Inventor: Kenneth Clunis, Stillwater, Minn.
[73] Assignee: Minnesota Mining and Manufacturing Company, St. Paul, Minn.
[21] Appl. No.: 723,588
[22] Filed: Sep. 15, 1976

Related U.S. Application Data
[63] Continuation-in-part of Ser. No. 569,871, Apr. 21, 1975, abandoned.

[51] Int. Cl.$^2$ ............................................. G11B 3/10
[52] U.S. Cl. ................................ 274/23 R; 274/23 A
[58] Field of Search ........................... 274/23 R, 23 A

[56] References Cited
U.S. PATENT DOCUMENTS

| | | | |
|---|---|---|---|
| 3,623,734 | 11/1971 | Toyonaka et al. | 274/23 R |
| 3,830,505 | 8/1974 | Rabinow | 274/23 R |

*Primary Examiner*—Charles E. Phillips
*Attorney, Agent, or Firm*—Cruzan Alexander; Donald M. Sell; William B. Barte

[57] ABSTRACT

An improved phonograph pickup device having a pivotally mounted tone arm on which a drive coil and a sense coil are mounted and are coupled to a magnetic field. The level of current flow to the drive coil alters its position relative to the magnetic field. A cueing control circuit is connected for providing feedback controlled energization of the drive coil whereby damped movement of the tone arm is provided when it moves relative to the record disc. The sense coil is connected in the control circuit to provide a feedback signal for the circuit that is proportional to the velocity of the movement of the tone arm. The device also includes a cartridge responsive to both static and dynamic forces exerted between the cartridge and the record disc. The cartridge is connected as a part of a force control circuit which also provides feedback controlled current flow through the drive coil. When the cartridge is lowered into contact with a record disc, the force control circuit portion is operative to establish a preset force level between the cartridge and the record disc and by force feedback corrects for cartridge displacement forces represented by frequencies below the audio range, such as those presented by record warpage. The output of the cartridge is proportional to the force level present between the cartridge and the record disc surface. This output is feed back to the force control circuit. This circuit also provides a reference signal which establishes the preset force level and which is applied to a phase correction network including an amplifier, the output of which establishes the level of current flow to the drive coil. A control selection circuit coupled to the force control and the cueing control circuits selects the cueing control circuit to control the energization of the drive coil in response to an up or down cueing signal and selects the force control circuit to control the energization of the drive coil when the force level between the cartridge and the record disc is at least half of the desired force level.

5 Claims, 4 Drawing Figures

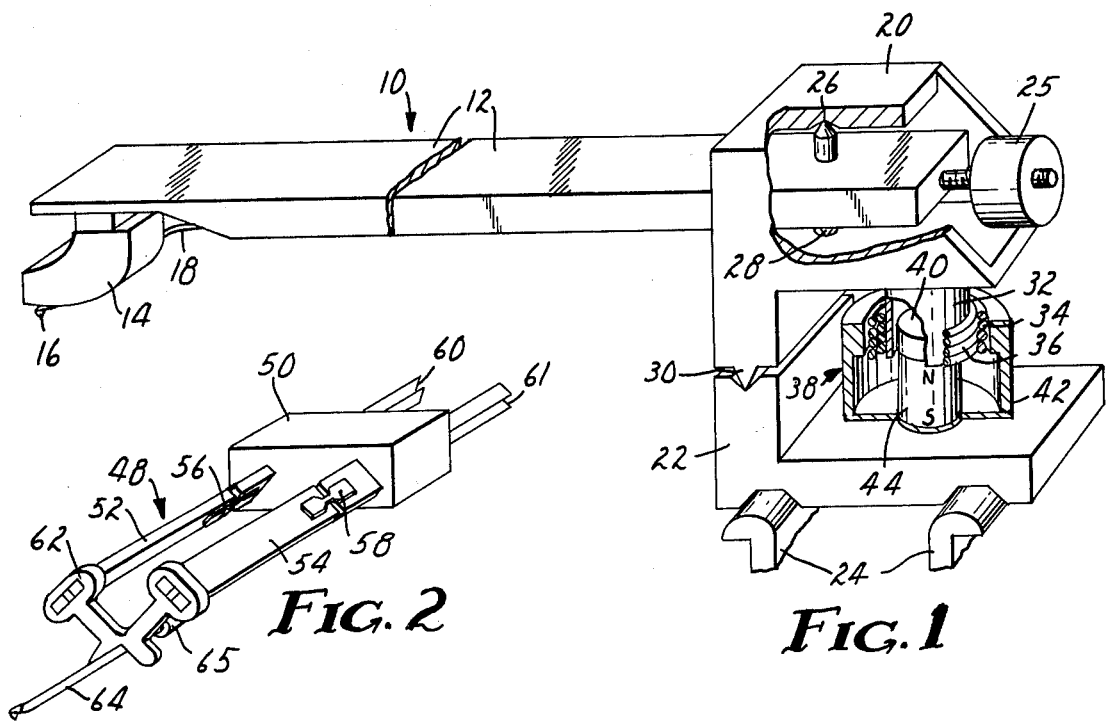
FIG. 1
FIG. 2
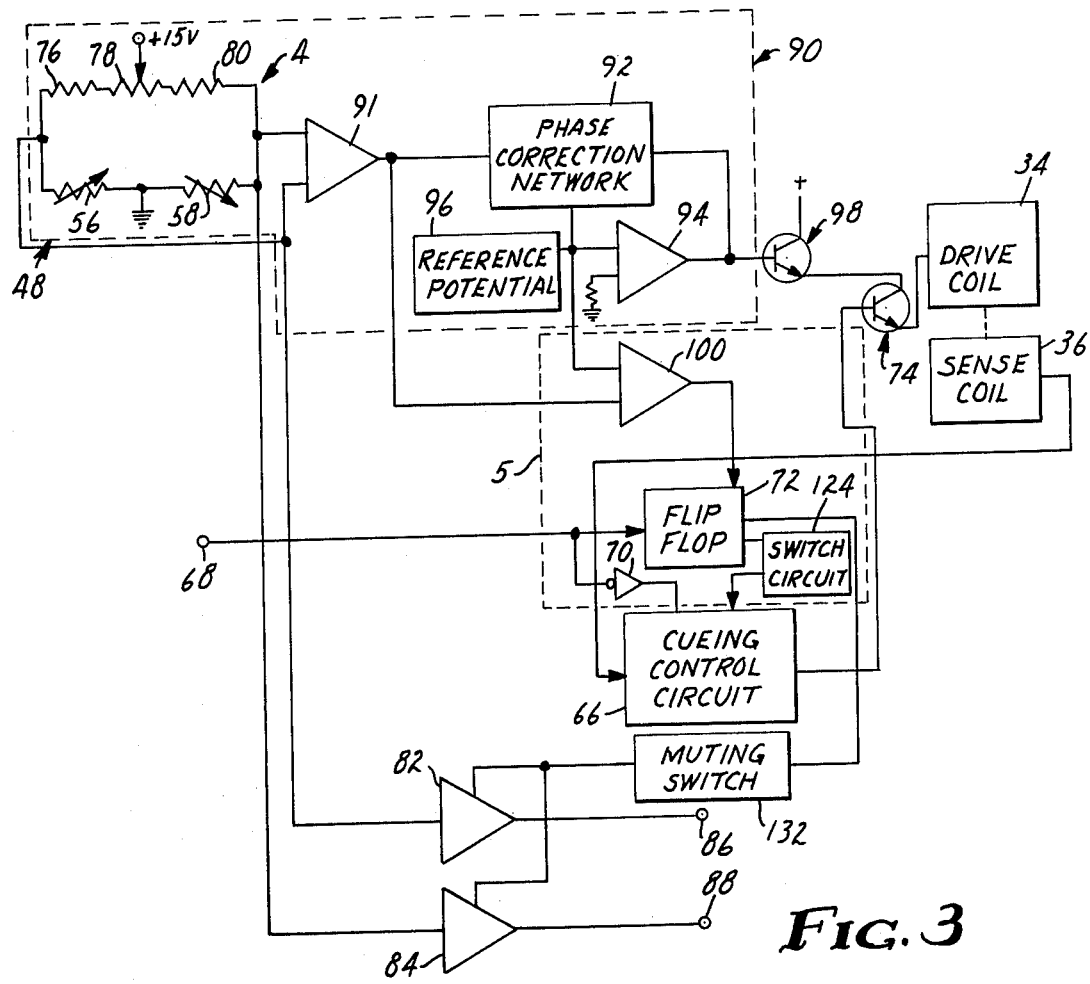
FIG. 3

PHONOGRAPH PICKUP DEVICE

CROSS REFERENCE TO RELATED APPLICATION

This is a continuation-in-part application of application Ser. No. 569,871, filed Apr. 21, 1975, now abandoned.

BACKGROUND OF THE INVENTION (1) Field of the Invention

The present invention relates generally to phonograph pickup devices having a pivotally mounted tone arm with a cartridge carried thereon and in one aspect to the controls therefor for providing damped movement of the tone arm to a record disc and in another aspect to the controls for establishing a predetermined relationship between the cartridge and the record disc and in particular to such controls using feedback control techniques. In another aspect this invention relates to such phonograph pickup devices wherein both types of controls are used with provision made for selectively controlling the operation of such controls.

(2) Brief Description of the Prior Art

As a result of the light stylus force with which high fidelity record players are operated to minimize distortions and to minimize wear on both the record and stylus, warpage of record discs presents a major problem in that the stylus may tend to skip over grooves in the discs. Such limitations in trackability have historically been partially overcome with the use of viscous damped tone arms. However, such arms have not proven practical, probably due to the elaborate mechanisms involved and due to the long term instability of the damping fluids.

In addition to damping the tone arms, trackability may also be improved by designing the tone arm mass and the cartridge compliance such that the natural period of the combination is just below the audible range. Such an approach has practical limitations.

U.S. Pat. Nos. 3,623,734 (Sakamoto & Goto) and 3,830,505 (Rabinow) disclose two alternative solutions involving the regulation of the relationship between the stylus and record disc to compensate for warpage and thereby to improve trackability. In both of these patents, a deviation signal corresponding to a change in the relationship is used to control a feedback loop to maintain the relationship constant. The system disclosed in U.S. Pat. No. 3,830,505 is designed to maintain a constant distance between the stylus and record disc, while the system disclosed in U.S. Pat. No. 3,623,734 is designed to maintain constant such factors as pressure, distance and velocity. Typical audio velocity sensitive transducers, such as those disclosed in these patents, provide an output signal at low frequencies, e.g., approximately ½ Hz corresponding to one revolution at 33 ⅓ rpm.

SUMMARY OF THE INVENTION

The phonograph pickup device of the present invention is generally of the type having a support on which pivotally mounted a tone arm on which a cartridge is carried. Greatly improved tracking characteristics over that of similar types of prior art pickup devices is obtained by the use of a cartridge which provides an output under static load conditions. Such an output is used in establishing a predetermined force level between the cartridge and a record disc surface. The cartridge provides a force feedback signal to a force control circuit which corresponds to cartridge displacement forces. The force control circuit provides for stabilized operation even when the displacement forces are at frequencies below the audio range, such as those caused by record warpage. The force with which the tone arm is pressed against a record disc surface is determined by the level of a drive signal coupled to a means for applying a force to rotate the arm about its pivot point.

The present invention also provides a cueing control means for providing feedback controlled energization of the force applying means to rotate the tone arm about its pivot point to provide damped movement of the tone arm to the record disc surface. The cueing feedback control is made possible by the use of a sensor which is responsive to the velocity of movement of the tone arm and which provides a motion signal which is applied to a feedback circuit. This feedback circuit is part of a circuit means for providing a control signal, which circuit means responds to an electrical signal corresponding to the motion signal from the feedback circuit and to a reference signal provided by a reference potential network within the circuit means to provide the control signal which is proportional to the difference between the two signals. The cueing control means also includes a drive means responsive to the control signal for providing the drive signal for energizing the force applying means. If desired, the present invention permits both the force and cueing control circuits to be used in a pickup device. In such an embodiment, a control selection circuit is provided which connects with both the force and the cueing control circuits and controls their operation in relation to each other, i.e., the operation of the cueing control circuit is initiated for lowering the tone arm to a record disc and is then terminated as soon as the force control circuit detects a predetermined force level between the cartridge and record disc. Alternatively, the operation of the force control circuit is terminated upon the application of a signal to the control selection circuit for signaling the cueing control circuit to permit the tone arm to be raised from the record disc.

The sensor of the cueing control means responds to the velocity of movement of the tone arm and comprises a sense coil rigidly mounted on the arm. The cueing control means further comprises means for establishing a magnetic field across a fixed gap through which the sense coil moves when the tone arm pivots. The magnetic field providing means is secured to the support for the tone arm, and includes inner and outer concentric pole faces defining the gap. The sense coil and gap are positioned in the same plane with the pivot. In such one embodiment, the means for applying a force to rotate the tone arm about its pivot point comprises a drive coil, which like the sense coil, is rigidly mounted on the tone arm and includes the above-mentioned means for establishing a magnetic field across a fixed gap. When a sense coil is also present, the drive coil may be wound on the same coil form as the sense coil.

One embodiment for the cartridge which provides an output at a static load includes a cartridge having a stereophonic transducer including at least two variable resistance members, each of which change resistance in response to a force exerted between the cartridge and the record disc surface which is transmitted to the resistance members. The resistance members are connected in the force control circuit to provide two legs of a D.C.

resistive bridge which is balanced when the cartridge is not in contact with the record disc surface and which provides an unbalance signal proportional to the force between the cartridge and the record disc when they are in contact. The force control circuit includes means for providing a tracking force reference signal corresponding to a desired predetermined normal tracking force between the cartridge and the record disc and an amplifier means responsive to the tracking force reference signal and to is applied with a signal from a phase correction circuit to which the amplified signal from the bridge circuit is connected. The output of the amplifier means provides the drive signal to control the energization of the drive coil to maintain the predetermined tracking force.

In one embodiment in which the cueing control circuit and the force control circuit are used, the drive coil is energized via two series connected amplifiers, one connected for control by the output of the cueing control circuit and the other connected for control by the output of the force control circuit. When the tone arm is not in contact with the record disc the output of the force control circuit is such that the amplifier it controls is operating at saturation. Similarly, when the operation of the cueing control circuit for lowering the tone arm is terminated, the cueing control circuit provides an output such that the amplifier it controls is operating at saturation. Under these conditions, the level of energization of the drive coil is determined by the amplifier that is not operating at saturation.

In one embodiment, the cartridge used with the phonograph pickup device includes a stereophonic transducer having variable resistance force responsive members mounted to null out any any resistive changes due to temperature changes which would otherwise unbalance a bridge circuit in which the members are connected.

BRIEF DESCRIPTION OF THE DRAWING

FIG. 1 is a cut-away stylized perspective view of a phonograph pickup arm embodying the present invention;

FIG. 2 is a perspective view of one type cartridge preferably used in conjunction with the present invention;

FIG. 3 is a combined circuit and block diagram showing various aspects of the present invention.

DETAILED DESCRIPTION OF THE INVENTION

Figure 4:
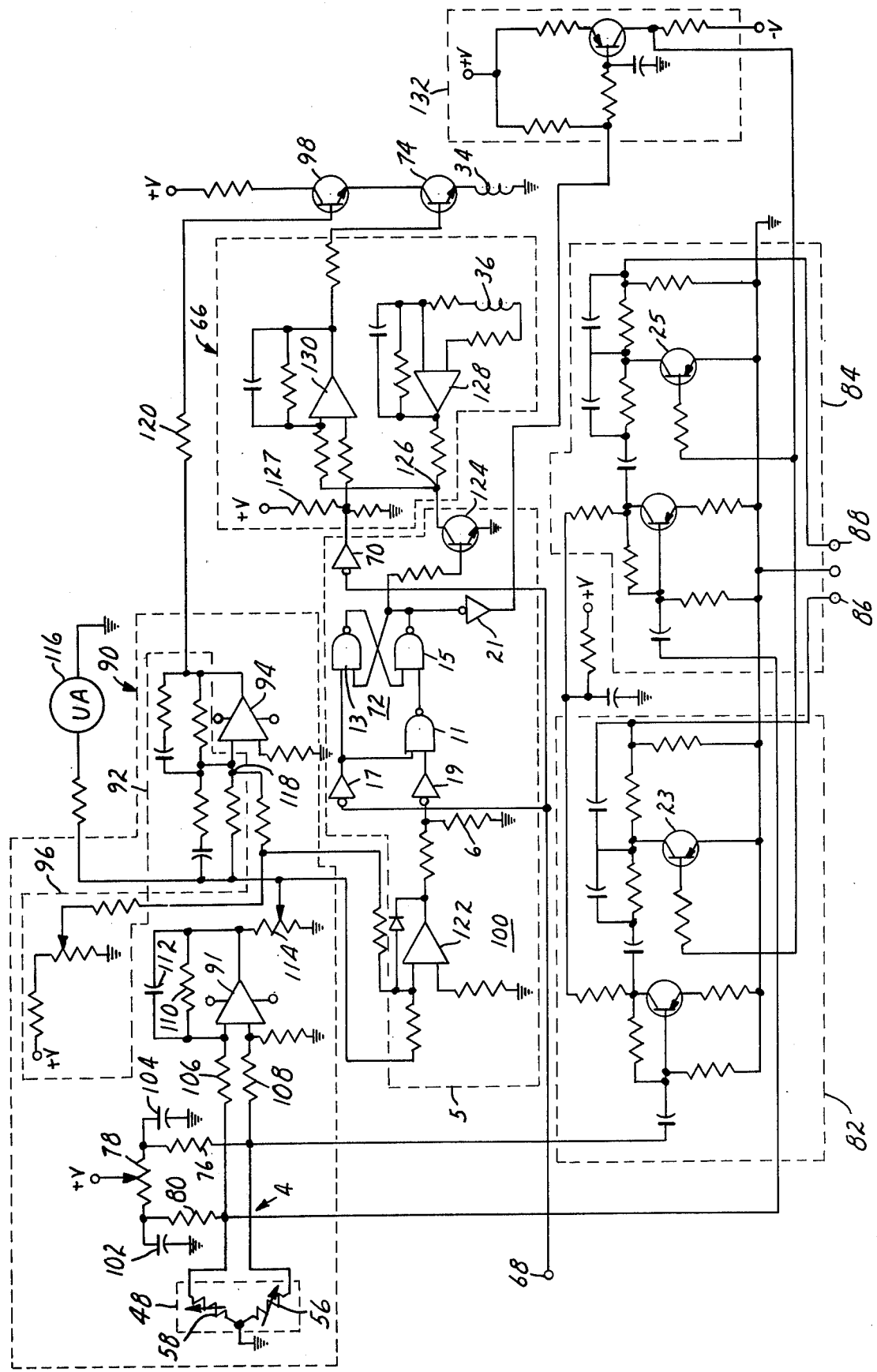
FIG. 4 is a detailed schematic diagram of a preferred circuit embodying the present invention.

As shown in FIG. 1, the phonograph pickup device 10 embodying the present invention includes a tone arm 12 having mounted at one end a phonograph cartridge 14 to which a stylus 16 is compliantly mounted in a conventional fashion. The electrical leads 18 from the cartridge 14 are concealed within the tone arm 12 in a conventional manner. The tone arm 12 is mounted on a support member 20, which member is pivotably mounted on a carriage 22. The carriage 22 is adapted to be laterally translated on a rail assembly 24 to thereby traverse the stylus 16 across a record disc surface such that the stylus path passes through the center of the record, thereby eliminating tracking error. Such an assembly is similar to that disclosed in U.S. Pat. No. 2,915,315 (Rabinow). The arm is fitted with a counterweight 25 which is desirably adjusted such that the tone arm 12 is biased to pivot the arm away from the surface of a record disc with a force of about 6 gms which has proven adequate for severely warped records. The tone arm 12 is mounted on the support member 20 on horizontal pivots 26 and 28 so as to allow horizontal motion of the arm within the constraints imposed upon such movement by the side walls.

The assembly including the tone arm 12 and the support member 20 is mounted on the carriage 22 via the vertical pivot 30 such that the assembly is able to rotate in a vertical direction, thus enabling the cartridge 14 and stylus 16 to be lowered into contact with a record disc surface. A coil form 32 is secured to the support member 20 and secured to the coil form 32 are a drive means i.e. coil 34 and a sense coil 36, these members being positioned such that the coils lie within the gap of a magnet assembly 38 mounted on the carriage 32. This magnet assembly or magnetic field providing means 38 includes a center pole face 40, an outer pole face 42 which surrounds the center pole face 40 and a center permanent magnet 44 and is positioned such that the gap lies in the plane of the vertical pivot 30. The magnet assembly 38 and the coils 34 and 36 mounted on the coil form 32 are substantially the same as that utilized in conventional permanent magnet speaker cone constructions. The drive coil 34 is connected so that current flowing therein will cause it to move upward, thereby causing the cartridge end of the tone arm to move downward in opposition to the counterforce provided by the counterweight 25. When the cartridge is not in contact with a record disc surface, the level of current flow through the coil 34 determines the velocity with which such movement is effected. When the sense coil 36 is moved relative to the magnetic field provided by the magnetic assembly 38, a voltage is induced in the coil 36 that is proportional to the rate of motion (velocity) of the coil in accordance with Lenz's Law.

While the combined mounting of the drive and sense coils 34 and 36 respectively is desirable due to the economies and simplicity afforded by the common use of a single magnetic field structure, it is similarly within the scope of the present invention to position the drive and sense coils in a variety of locations along the tone arm assembly.

The means for moving the carriage 22 along the track 24 are not shown and may be any of a variety of conventional means, including that set forth in U.S. Pat. No. 2,915,315. A detailed description of the manner in which the sense coil 36 may be used in a cueing control circuit to provide feedback controlled cueing of the tone arm whereby damped movement of the tone arm is provided and of the manner in which the output of the cartridge 14 may be used in a force control circuit to provide force feedback control of the force level between the cartridge and the record disc surface relative to a preset force level, with controlled selection of the operation of the cueing control circuit and the force control circuit will be set forth in conjunction with the description of FIGS. 3 and 4.

FIG. 2 shows a preferred embodiment of a cartridge construction 48 which may be used with the present invention. This cartridge includes a mounting pad 50 into which two transducer beams 52 and 54 may be mounted in the conventional 45° configuration. Leads 60 and 61 to transducer elements 56 and 58 mounted on the beams are conveniently brought through the pad 50 to make appropriate connections to the elements. Each of the beams 52 and 54 is constructed in a like manner and preferably consists of a relatively stiff center member. Such a member is conveniently molded of epoxy resin, and has a section of significantly thinner cross-sectional area forming a hinge. A semiconductive "Pixie" element such as that manufactured by Endevco, Inc., Pasadena, California, Model 8101 is secured to the supporting member across the hinge area. In this manner a lateral force applied to the beam will cause the beam to flex at the hinge area such that the force is translated into stress on the "Pixie" element 56 or 58 respectively. The beams are desirably gold plated on the opposing surfaces and an electrically connecting strap applied to the one end of the beam so as to enable the electrical leads 60 and 61 to make contact to the elements 56 and 58. The far end of the beams are mounted in a coupling yoke 62 and a low mass stylus 64 is positioned in a damping pad 65 such that the needle rests in the coupling yoke 62 in a conventional manner.

For certain applications, such a construction has a major limitation in that if the elements 56 and 58 are positioned symmetrically, i.e., such that the elements 56 and 58 are both on top of the respective beams 52 and 54, upward vertical motion of the stylus will compress both the elements 56 and 58 and hence will cause a decrease in the resistance of the respective elements. Since such piezoresistive elements are highly temperature sensitive, a change in the ambient temperature will act on both elements and will cause the resistance of each element to change in the same manner, thus changing the calibration of the signal produced for a given force between the stylus and a record disc surface. For applications where only relative signal intensities are considered, and where variations in the signal output from each channel are not paramount, such a situation is not material. However, for applications where absolute signal intensities are required and where the output from each channel must be the same, such as in the present invention, such temperature sensitivity is highly undesirable.

Accordingly, in the present invention, one of the beams, such as beam 52, is inverted such that the element 56 is positioned on the bottom, opposite to the positioning of the beam 54. In this manner, a vertical deflection of the stylus 64 causes the element 56 to be stretched while the element 58 is compressed. A given horizontal displacement such as that produced by variations in phonograph disc grooves causes both members to be either compressed or stretched. The inversion of one of the beams such as beam 52 causes resistive changes in the respective members resulting from temperature variations to be nulled out. This not only avoids variations in the absolute signals produced under a given applied force but also prevents temperature changes from unbalancing bridge circuits typically used in conjunction with such cartridge constructions. This arrangement also results in proper phasing of the stereo audio signals and thus eliminates the need for the otherwise required phase inversion stage for one of the stereo channels.

FIG. 3 is a combined schematic and block diagram of a preferred embodiment of the invention wherein a cueing control circuit 66, a force control circuit 90 and a control selection circuit 5 are used. The cueing control circuit 66, when selected for operation by the control selection circuit 5, provides an output which determines the level of current flow to the drive coil 34 which serves to produce a force to move the tone arm toward the record disc surface. The sense coil 36, though shown separately in FIG. 3, is connected in the cueing control circuit 66 and should be considered a part of such circuit. A voltage is induced in the sense coil which provides a feedback signal for the circuit 66 indicative of the velocity of movement of the coil effected by the output provided by the control circuit 66 to energize the drive coil 34 via the amplifier 74. In addition to the sense coil 36, the circuit 66 includes a differential amplifier, which has its output connected to the amplifier 74, a source providing a reference voltage for the differential amplifier and feedback circuitry for feeding the signal provided by the sense coil 36 back to the input of the differential amplifier in the proper form for stable operation of the cueing control circuit. The differential amplifier in the control circuit 66 determines the difference between the feedback signal derived from the sense coil 36 and the reference voltage for the differential amplifier and in response thereto provides a signal at its output that is proportional to such difference which is applied to the amplifier 74 connected to the drive coil 34.

In operation, when the tone arm is up and stationary, a zero signal will be provided from the sense coil 36 so that the difference between that signal and the reference signal for the differential amplifier will be large at the same time that the cueing control circuit 66 is turned on. The initial output from the amplifier 74 results in an upward driving force at the drive coil 34, which if not modified by the signal fed back from the sense coil, would cause the tone arm to be lowered onto the surface of a record disc at an unacceptably rapid rate. The motion of the sense coil 36 produces a signal which is proportional to the velocity of the coil and, which is fed back to the differential amplifier, is such that the difference between it and the reference signal is reduced, causing a corresponding change in the drive force produced at the drive coil thereby damping the movement of the tone arm toward the record disc.

After the cueing control circuit 66 has brought the cartridge on the tone arm into contact with the record disc, the control selection circuit 5 responds to a signal from the force control circuit 90 to alter the operation of the cueing control circuit 66 so the output of the force control circuit 90, rather than the cueing control circuit 66, controls the power applied to the drive coil 34 and thus the force exerted between the cartridge on the tone arm and the record disc.

Referring to FIG. 3, the force control circuit 90 includes a bridge circuit 4, an operational amplifier 91, a phase correction network 92, a reference potential network 96 and an amplifier 94. The bridge circuit 4 includes the two variable resistance elements of the stereophonic semiconductor type transducer 48 described in connection with FIG. 2. One terminal of each of the elements 56 and 58 is attached to a ground lead, while the other terminal of each of the elements is connected to opposite sides of a voltage divider network consisting of three resistors 76, 78 and 80, thereby completing the bridge circuit. Resistor 78 is provided with a center tap which is connected to a source of DC potential. The bridge circuit may be balanced by adjusting the center tap of the resistor 78 such that when the tone arm is up and no force is exerted thereon by a record disc surface, the same potential is present at the outputs of each of the elements 56 and 58. The output of the bridge, which appears across the resistors 56 and 58, is connected to the operational amplifier 91. The output of amplifier 91 is proportional to the force existing between the cartridge and the record disc surface and thus provides a force feedback signal to the force control circuit 90.

The output of amplifier 91 is applied to a phase correction network 92 which in turn is mixed with a signal from the reference potential network 96 and is applied to the amplifier 94. Since feedback is being provided for control at frequencies below the audio range, such as those due to warpage, the phase correction network 92 is provided to ensure overall system stability at such frequencies. The output of amplifier 94 is applied to the amplifier 98 which controls the current flow to the drive coil 34. With the force feedback being so used, the current flow to the drive coil is automatically adjusted to cause the desired force level to be provided between the cartridge and the record disc surface. If the force between the cartridge and a record disc surface, as indicated at the output of amplifier 91, is less than the predetermined reference potential provided by the network 96, the output of amplifier 94 is increased to increase the output of amplifier 98 to apply an additional driving force to the coil 34. Conversely, if the output of amplifier 91 is greater than that indicated by the reference potential network 96, the outputs are decreased so as to lessen the force provided by the drive coil 34.

The control selection circuit 5 includes a comparator 100, a switch circuit 124, inverter 70 and a flip-flop control circuit 72. The comparator 100 together with cueing command signals applied at 68 serve to control the operation of the flip-flop circuit 72. The cueing command signals also control the inverter 70 which is connected to the cueing control circuit 66. The output of comparator 100 is connected to one input to the flip-flop 72. The output of comparator 100 is dependent on the potential provided from the reference potential source 96 and the output of amplifier 91 of the force control circuit 90. The flip-flop control 72 controls the switch circuit 124 which is connected to the cueing control circuit 66 to control the application of the signal from the sense coil 36 as a feedback signal for the circuit 66.

When the tone arm is in the up position, the output of the flip-flop 72 is such that switch 124 is operated to permit a signal developed by the sense coil 36 to be effective as a feedback signal for the cueing control circuit 66. The output of the force control circuit 90 is then high enough to cause the amplifier 98 to operate at saturation to effectively connect the amplifier 74 directly to the drive coil 34 so that the energization of the drive coil is under the control of the cueing control circuit 66 connected through amplifier 74. Inverter 70 connected to the cueing control circuit 66 determines whether it will have an output. The cueing control circuit 66 provides a signal to the amplifier 74 when a "down" cueing signal is applied to the terminal 68 which is connected to control inverter 70. The terminal 68 is also connected to flip-flop 72. The tone arm is thus moved to the record disc surface under the control of cueing control circuit 66. When the tone arm is lowered to the record disc, the output of the bridge circuit 4 of the force control circuit 90 increases as the force between the cartridge and record disc surface increases. When the voltage from amplifier 91, which is determined by the output of bridge circuit 4, is about half that which is present when the desired tracking force is attained, the comparator 100 in the control selection circuit 5 is operated to provide a signal to the flip-flop 72 to cause it to operate switch 124 so as to remove the effect of the signal from the sense coil 36 on the operation of the cueing control circuit 66. This causes the output of the cueing control circuit to increase, causing the amplifier 74 to operate at saturation and thereby transfer control of current flow through the drive coil 34 to the force control circuit 90 which is connected to amplifier 98.

Operation of the force control circuit 90 continues until an "up" cueing signal, which is opposite in logic to that of the "down" cueing signal, is applied to terminal 68 to effect upward movement of the tone arm to the raised position. Application of the "up" cueing signal causes the inverter 70 to be operated to terminate the output to amplifier 74 and thereby terminate any current flow to the drive coil 34. With the drive coil 34 de-energized, the tone arm moves to the "up" position in response to the counterweight 25. The "up" signal is also applied to the flip-flop 72 to cause it to provide a signal to the switch 124 to condition it so that the signal provided by sense coil 36, when the cueing control circuit 66 is again operated in response to a "down" signal, will be effective as a feedback signal to damp the downward movement of the arm.

It should be noted that the two variable resistance elements 56 and 58 are also coupled to audio preamplifiers 82 and 84, respectively, which via output terminals 86 and 88 are connected to conventional power amplifiers (not shown) and loud speaker assemblies (not shown). The output of the flip-flop 72 of the control selection circuit 5 is also connected to control a muting switch 132 which is connected to the two preamplifiers 82 and 84. The muting switch 132 is effective in response to the output of the flip-flop 72 to disable the amplifiers 82 and 84 at all times, except when the force control circuit 90 is controlling the energization of the drive coil 34.

A detailed schematic of the circuit corresponding to the block diagram of FIG. 3 is shown in FIG. 4. Referring to the cueing control circuit 66, the differential amplifier is indicated at 130 with the reference voltage for it being provided at one input by the reference potential network 127 comprising two series resistors connected between a positive voltage and ground. The circuitry for feeding the signal provided by the sense coil 36 back to the input of the differential amplifier 130 in the proper form for stable operation of the cueing control circuit includes a high gain operational amplifier 128. Both ends of the sense coil 36 are connected to the amplifier 128 to prevent signals from the drive coil 34 from being coupled through a ground connection into the sense coil. When the cueing control circuit 66 is operative to lower the tone arm, the output of the amplifier 128 is applied to the other input of the differential amplifier 130. The difference between the reference voltage signal provided by the network 127 and the feedback signal from amplifier 128 determines the output of the amplifier 130 which is connected to control the output of the amplifier 74, which is connected to the drive coil 34. The amplifier 74, may, as shown, be a single transistor. As indicated in connection with FIG. 3, the amplifier 98 is conditioned by the force control circuit 90 to operate at saturation when the cueing control circuit 66 is operated to lower the tone arm, so the degree of conduction of the transistor 74 as determined by the cueing control circuit 66 determines the current flow through the drive coil 34. Like amplifier 74, the amplifier 98 may, as shown, be a single transistor. The cueing control circuit 66 need not be used with the force control circuit 90 and in such case the amplifier 98 would not be present.

The difference between the level of the reference voltage and the feedback signal provided to amplifier 130 determines the rate at which the tone arm is lowered. With the feedback circuit portion fixed, the level of the reference voltage is determinative of the rate and, if changed, will provide an increase or decrease in the rate at which the tone arm is lowered. If an adjustable rate is desired, the lower resistor in the network 127 can, for example, be replaced with a potentiometer with the connection to the amplifier 130 made via the movable contact of the potentiometer.

When the tone arm is in the up position and at rest, the feedback signal will be zero, causing a maximum signal difference at the amplifier 130. Accordingly, in order that the tone arm remain in the up position until a cueing "down" command signal is applied, operation of the amplifier 130 must be inhibited. This can be done by connecting the reference voltage connection to the amplifier 130 to ground. If the cueing control circuit 66 were to be used without the need for a control selection circuit 5, an operator actuated switch could be used to make the ground connection for cueing the arm "up" with the switch then operated to remove the ground for cueing the arm "down." The manner in which control of the amplifier 130 is obtained in the arrangement shown in FIG. 4 will be discussed in connection with the control selection circuit 5 which provides such control.

The force control circuit 90 provides a predetermined force level between the cartridge and the record disc surface after the arm has been lowered and includes the bridge circuit 4, an operational amplifier 91, a phase correction network 92, an amplifier 94 and means for providing a tracking force reference signal such as a reference potential network 96.

The bridge circuit 4 has its output connected to the operational amplifier 91 and includes the variable resistance elements 56 and 58 of the cartridge 48 and the three resistive elements 76, 78 and 80. Capacitors 102 and 104 are preferably connected in the bridge circuit to isolate the cartridge signals from each other and also from other circuits. The signals from the variable resistance elements 56 and 58 are also coupled to audio amplifiers shown in detail within the blocks 82 and 84. These amplifiers are not directly involved in any further aspects of the present invention and are constructed according to conventional audio design techniques.

The output from the bridge circuit is coupled through resistors 106 and 108, respectively, to the operational amplifier 91. A feedback network consisting of resistor 110 and capacitor 112 is connected between the output of the amplifier 91 and the negative input thereto to control the gain. Control of the portion of the output of the amplifier 91 to be used is provided by the variable resistor 114, which may, for example, be adjusted to provide an output corresponding to a one volt signal per unit of force existing between the cartridge 48 and a record disc surface. The magnitude of the output of amplifier 90 is thus proportional to the vertical force existing between the cartridge 48 and the record surface. This output may conveniently be monitored by a meter 116.

The force indicating signal from amplifier 91 is further coupled through the variable resistor 114 to a phase correction network 92. This network comprises a conventional capacitive-resistive network in a "lead-lag" arrangement which prevents the force control circuit 90 from oscillating. The output from the network 92 is summed by means responsive to the phase corrected signal and to the tracking force reference signal such as node 118 at the input to amplifier 94 with the tracking force reference signal provided by the reference potential network 96. The reference potential network 96 comprises a variable resistance network and a fixed stable voltage +V, and is adjusted to provide a potential corresponding to a desired, i.e., predetermined normal, tracking force. The output from the amplifier 94 is coupled through a resistor 120 to the amplifier 98 to thereby control the current applied to the drive coil 34.

When the tone arm is up and no force thus exists between the cartridge 48 and a record disc surface, a balance condition will exist at the bridge 4. Under such conditions, a maximum difference between the tracking force reference potential and the force indicating signal will be produced. This in turn will cause a maximum output from the amplifier 94 which will condition the amplifier 98 to operate at saturation. The current to the drive coil 34 is then dependent on the level of conduction of the amplifier 74. Conversely, when the cartridge 48 is in contact with the record disc surface, and providing a tracking force that is at least one-half the desired tracking force, the cueing control circuit 66, as explained in connection with FIG. 3, will be conditioned so the amplifier 74 operates at saturation and the current flowing through the amplifier 98 will be controlled in accordance with the output from amplifier 94 and will thereby control the force provided by the drive coil. With the force feedback provided by the cartridge as an input to bridge 4, a constant force between the cartridge 48 and a record disc surface is maintained as set by the tracking force reference voltage provided by the network 96.

In the event the force control circuit 90 is used without the cueing control circuit 5, the amplifier 74 would not be present and the requirement that the tracking force reach a certain level before the force control circuit 90 controls the current through the drive coil 34 would not be present. It is then necessary only to have the cartridge in contact with the record disc before initiating operation of the force control circuit 90.

The control selection circuit 5 is needed when both the force control circuit 90 and the cueing control circuit 66 are included in a phonograph pickup device. The circuit 5 includes a comparator 100, a switch circuit 124, an inverter 70 and a flip-flop control circuit 72. The comparator 100 includes the amplifier 122 which is connected to provide a logical high signal across the load resistor 6 until the voltage obtained from the connection to resistor 114 of the force control circuit 90 reaches a predetermined level, such as the voltage obtained when force between the cartridge and record disc is aout one-half that which is present when the desired tracking force is attained. When the predetermined voltage level from resistor 114 is reached, the output of the amplifier 122 is sharply reduced, causing a logical low signal to be present at the load resistor 6. The flip-flop control circuit 72 includes the three NAND gates 11, 13 and 15 and the inverter 17 connected between gate 13 and the cueing command signal input 68, plus the inverter 19 connected between gate 11 and the load resistor 6. The input 68 is also connected to the inverter 70 which has its output connected to the same input of amplifier 130 to which the reference potential network 127 is connected. The inverter 70 controls the operation of amplifier 130 of the cueing control circuit 66. The switching circuit 124, which, for example, may be a single transistor, is connected to the output of NAND gate 15 and to the connection 126 in the feedback loop of the cueing control circuit 66. A logical high at the output of NAND gate 15 causes the transistor 124 to conduct, preventing any feedback signal from reaching the amplifier 130. When no feedback signal is present at amplifier 130, the maximum difference in the signals applied thereto causes the amplifier 74 to operate at saturation.

Referring then to the operation of the cueing control circuit 5 and assuming the tone arm is up, the cueing command signal at 68 will be a logical high, causing the inverter 70 to be conducting to provide a logical low to the amplifier 130 so that the amplifier 130 is inoperative, causing the amplifier 74 to be off. The output of NAND gate 15 is then a logical low, causing the transistor 124 to be off so that the feedback loop of the cueing control circuit will be operative when a "down" command (logical low) is applied to the input 68. Such a "down" command will cause the inverter 70 to present a logical high to cause amplifier 130 to operate and control the output of amplifier 74. When the tone arm is up or in the raised position, the force control circuit 90 will be providing an output which conditions the amplifier 98 to operate at saturation. Control of the current to the drive coil 34 while the tone arm is lowered will thus be determined by amplifier 74 under the control of the cueing control circuit 66. The operation of the cueing control circuit 66 to lower the tone arm is initiated by a "down" command signal to input 68.

When the force between the cartridge and the record disc surface reaches the level necessary to cause the output of the comparator 100 to switch from a logical high to a logical low, the output of the flip-flop 72 and NAND gate 15 changes to a logical high, causing the transistor 124 to conduct to disable the feedback loop of the cueing control circuit 66. Without the feedback signal, the amplifier 130 provides an output to cause the amplifier 74 to operate at saturation to effectively connect the drive coil 34 to the amplifier 98 so that the current level to the drive coil 34 is then under the control of the force control circuit 90 until an "up" cueing command signal is again applied to the input 68.

The flip-flop 72 of control selection circuit 5 also includes an inverter 21 which is connected between the NAND gate 15 of the flip-flop 72 and the muting switch 132 for the pre-amplifiers 82 and 84. The muting switch 132 may, for example, be a single transistor which, under the control of the flip-flop 72, is either conducting or not conducting and when in one of such states provides a signal for use in muting the pre-amplifiers. In the muting switch 132 shown in FIG. 4, a high logical signal from the inverter 21 causes the transistor to be held off so that a negative voltage is provided to the base of PNP type transistors 23 and 25 in pre-amplifiers 82 and 84, respectively, to cause such transistors to conduct to ground, preventing any signal from reaching the outputs 86 and 88 of the pre-amplifiers. When a low logical signal is received by the muting switch 132 from the inverter 21, which will occur when the force between the cartridge and the record disc is sufficient to cause the comparator 100 to provide a low logical signal to the flip-flop 72, the transistor in the muting switch is turned on to provide a positive voltage to the transistors 23 and 25 in the pre-amplifiers turning such transistors off and thus remove the muting path the ground allowing each of the pre-amplifiers 86 and 88 to present an output.

A turntable fitted with a pickup device of the present invention set to provide a tracking force equivalent to two grams has been found to produce approximately a 10–15 db improvement in the rejection of input perturbations in the low frequency range below 15 Hz. Further, an order of magnitude improvement in the maximum tracking capability of the arm system, when feedback controlled as disclosed in the present invention has been found over a similar arm operated without such feedback control.

Having thus described the present invention, what is claimed is:

1. A pickup device for record players comprising
   (a) a tone arm having a phonograph cartridge at one end,
   (b) support means for pivotally supporting the tone arm for movement toward and away from a record disc surface,
   (c) force applying means responsive to a drive signal for controllably applying a force to rotate the tone arm toward said record disc surface to bring said cartridge into contact with said record disc surface, and
   (d) cueing control means for controlling the movement of said tone arm to said record disc surface comprising
      (i) magnetic field providing means secured to the support means including inner and outer concentric pole faces, defining a gap therebetween which lies in the same plane as that of the pivot, and means providing magnetic flux to the pole faces such that a magnetic field extending across the gap is established,
      (ii) a sense coil rigidly positioned on the tone arm such that when the cartridge is in contact with said record disc surface the coil is centered in said gap for generating a motion signal corresponding to the rate at which the tone arm moves,
      (iii) circuit means for providing a control signal proportional to the difference between two signals, said circuit means having a reference potentiaL network for providing a reference signal as one of said two signals and having a feedback circuit connected to receive said motion signal and in response thereto providing a signal as the other of said two signals, and
      (iv) drive means responsive to said control signal for producing a said drive signal for energizing said force applying means whereby rotation of the tone arm toward said record disc is electrically controlled.

2. A pickup device according to claim 1, wherein said force applying means comprises a drive coil mounted on said tone arm adjacent to said sense coil and in the same plane such that both of said coils are centered in said gap.

3. A pickup device according to claim 1, wherein said cartridge includes a stereophonic transducer having at least two variable resistance members, each of which is directly responsive to a force exerted between said transducer and said record disc surface, and
   wherein said device further comprises a force control circuit including (a) a DC resistive bridge, two legs of which are supplied by said resistance members of said transducer, for producing a signal that is proportional to the force between said transducer and said record disc surface, (b) means for providing a tracking force reference signal corresponding to a desired predetermined normal tracking force, and (c) means responsive to said force reference signal and to a phase corrected signal corresponding to said signal from the bridge for providing a drive signal to control the energization of the drive coil to maintain said predetermined tracking force.

4. A pickup device according to claim 3, further comprising control selection means coupled to said circuit means and to said force control means for controlling the operation of each relative to the other such that the operation of the cueing control means is initiated to lower the tone arm to said record disc surface and is terminated when the force control means detects a predetermined force level between the cartridge and record disc surface, and such that the operation of the force control means is terminated in response to cueing signal enabling the cueing control means to permit the tone arm to be raised from the record disc.

5. A pickup device according to claim 3 wherein, said force responsive members are mounted such that a given displacement of the transducer with respect to said disc surface causes the resistance of one member to be increased and that of the other to be decreased so that resistive changes in the respective members resulting from temperature variations do not unbalance said bridge.

* * * * *